(No Model.) 2 Sheets—Sheet 1.
P. A. HAUSE.
MEAT TENDERING IMPLEMENT.
No. 471,973. Patented Mar. 29, 1892.
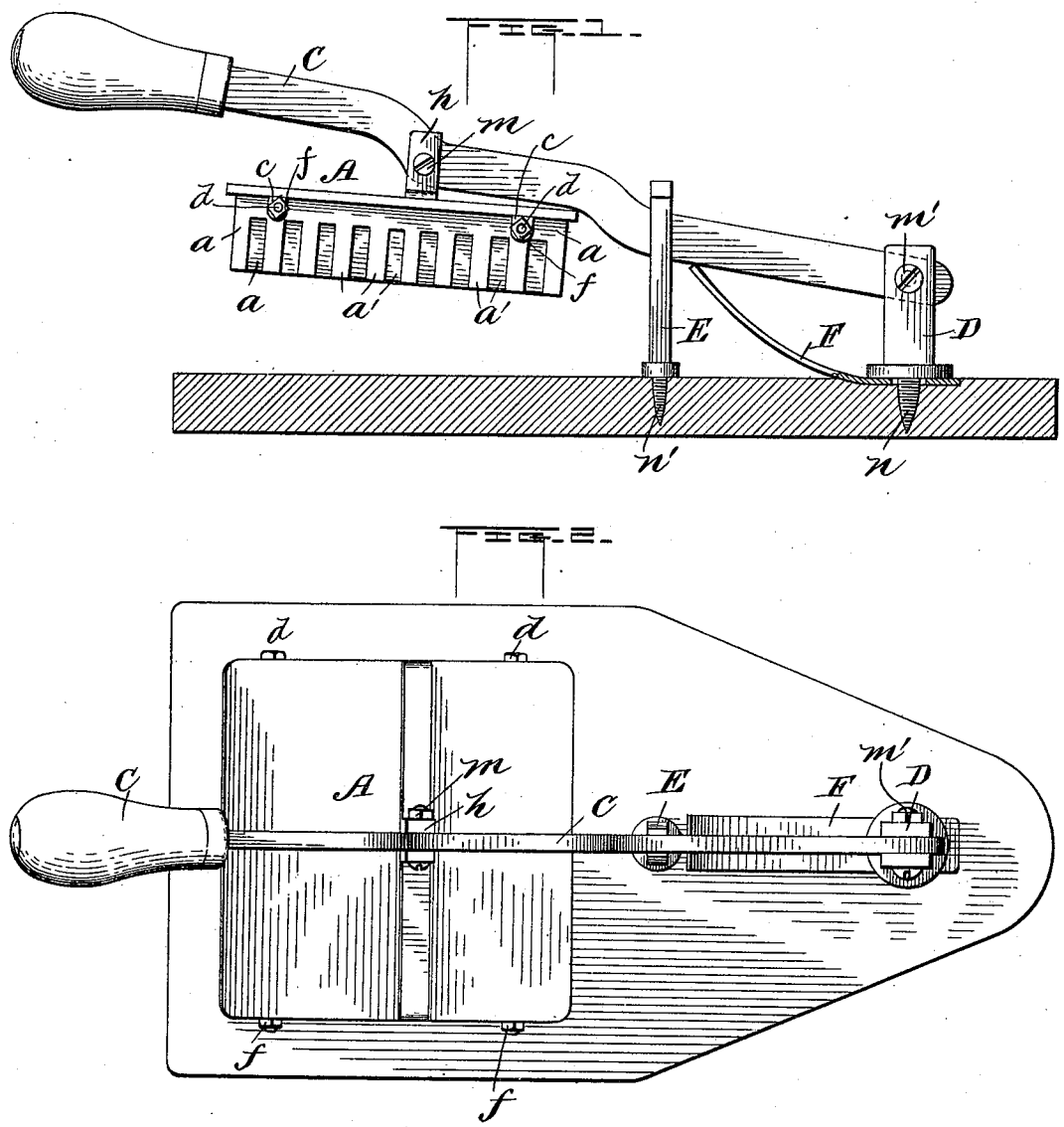

(No Model.) 2 Sheets—Sheet 2.
P. A. HAUSE.
MEAT TENDERING IMPLEMENT.
No. 471,973. Patented Mar. 29, 1892.
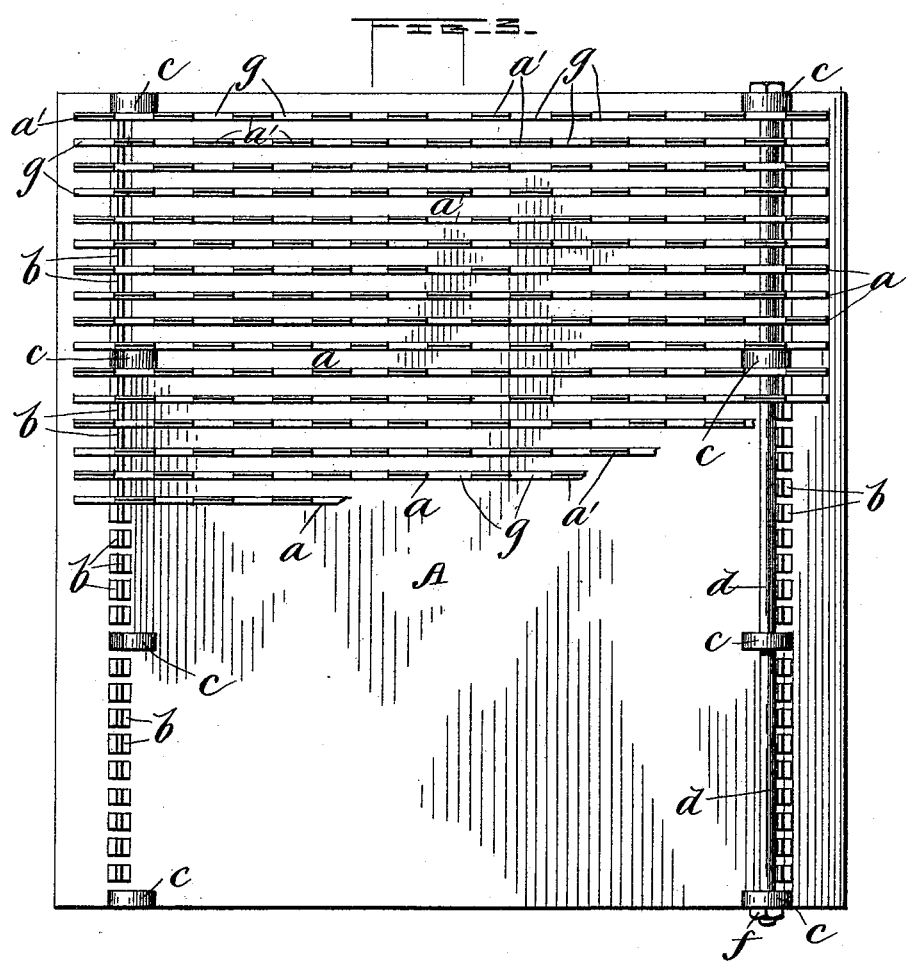
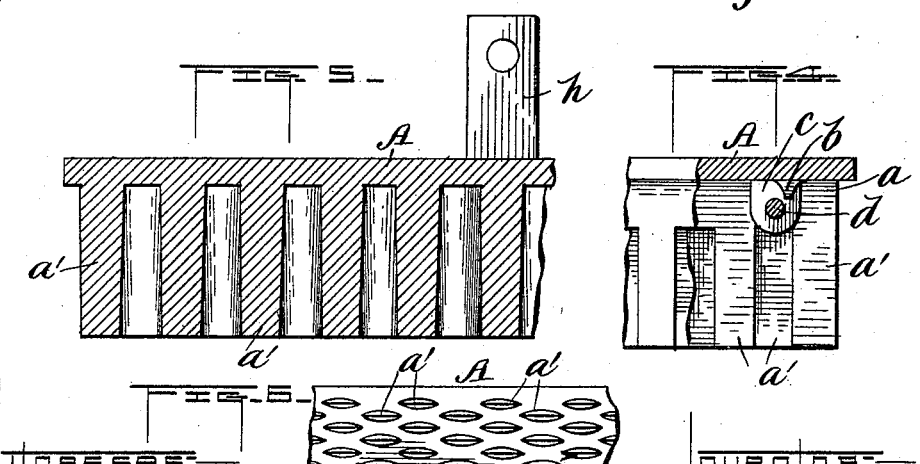

UNITED STATES PATENT OFFICE.

PETER A. HAUSE, OF BALTIMORE, MARYLAND.

MEAT-TENDERING IMPLEMENT.

SPECIFICATION forming part of Letters Patent No. 471,973, dated March 29, 1892.

Application filed October 27, 1891. Serial No. 409,984. (No model.)

*To all whom it may concern:*

Be it known that I, PETER A. HAUSE, a citizen of the United States, residing at Baltimore, in the State of Maryland, have invented certain new and useful Improvements in Meat-Tendering Implements; and I do hereby declare the following to be a full, clear, and exact description of the invention, such as will enable others skilled in the art to which it appertains to make and use the same.

My invention relates to a hand-implement for treating meat, especially beefsteaks, for the purpose of rendering the same tender; and it consists in the special construction, arrangement, and combination of parts of such implements whereby their effectiveness is greatly enhanced, while simplicity of construction and convenience of affixing the machine in its place of use, as well as repairs of its parts, are secured, as will be hereinafter described.

In the accompanying drawings, Figure 1 is a side elevation and partial section of my improved meat-tendering implement affixed to a platform, which is shown in section. Fig. 2 is a top view of the same. Fig. 3 is an inverted plan view of the tendering-plate with puncturing-blades detached from the other parts. Fig. 4 is a detail view partly in vertical section and side elevation. Fig. 5 is a broken vertical section showing another construction of tendering-plate with blades, the blades being cast integral with the plate; and Fig. 6 is a broken inverted plan view of the plate with blades shown in Fig. 5.

A in the drawings represents a rectangular or other suitably-shaped meat-tendering plate, made of metal and provided on its under side with perforated metal strips $a$, having puncturing-blades $a'$ formed on them, said blades being tapered downward on both sides to an edge, and, as may be deemed best, the lower edge rounded in segmental form, as shown in Fig. 6, or made straight, as shown in the other figures.

The preferable manner of constructing the plate A is to provide on its under side a series of spacing-lugs $b$ and perforated lugs $c$, and to set the perforated metal strips $a$, on which the blades are formed, in rows between these spacing-lugs, and to pass headed screw-threaded clamping-bolts $d$ through the perforated lugs and perforated blades and confine the whole by means of nuts $f$. The metal strips on which the blades are formed are made of steel, and in constructing the blades they are arranged so that the spaces $g$ between the blades of one strip come opposite the blades $a'$ of another strip throughout the whole series of strips, and thus the blades are enabled to cut or punch spaced slits into the beefsteak or other meat, such slits being so disposed that the meat is not severed entirely, although cut or punched through from top to bottom. This is clearly illustrated in Figs. 3 and 6 of the drawings.

In Figs. 5 and 6 the blades are shown cast integral with the plate; but it is more advantageous to have the blades or strips constructed separately from the plate, because when a blade is broken it can be taken out and another substituted for it, and thus much of the expense which would be required for an entirely new plate is saved.

The plate described is provided on top with a pivoting-bracket $h$ near or at its center, and it is connected to a lever-handle C by means of said bracket and a pivot $m$, said handle being also pivoted, as shown at $m'$, to a collared standard D and guided by a bifurcated standard E. Each of the standards is provided with a pointed screw, as $n$ or $n'$, and around the screw $n$, beneath the collar of the standard D, a slotted spring F is applied and its free end made to bear against the under side of the lever-handle, as shown. The tendering-plate is so hung on its pivot to the handle and the handle so pivoted to its standard that the plate occupies a position when the hand is withdrawn from the handle and the spring is allowed to hold the handle and plate out of operating position or in a position ready for beginning the tendering operation that when the handle is depressed the blades will all strike the beefsteak squarely with respect to its top surface, and thus make clean, uniform, vertical cuts or punctures through it, without liability of tearing and pulling it to pieces.

The implement may be screwed to a regular platform or table-piece, or it may be screwed into a butcher's block. If it is applied to a block, the standard E might be dispensed with, if there is not room for its use. The standards might be fastened to the platform by side flanges or lugs having screw-holes through them, in which case the pointed screws would not be used.

This implement supplies a want in the butcher's market, meat store, hotel, and in families, and as it is very cheaply constructed most families can afford to purchase one.

What I claim as my invention is—

1. The meat-tendering plate adapted to be pivoted to a hand-lever and provided with spacing-lugs and perforated lugs on its under side, and with perforated cutter-strips having spaced cutters, the cutters of one strip standing, preferably, opposite the spaces between the cutters of another strip, and clamping screw-bolts for securing the cutter-strips to the plate, substantially as described.

2. The meat-tenderer comprising a plate having a pivoting bracket $h$ and puncturing or cutting blades arranged, preferably, so that the blades of one row stand opposite the spaces of another row of blades, a lever-handle having accommodating angular bends or curvatures between its ends and pivoted to a standard D, and having the tendering-plate connected to it by a pivot passed through the bracket $h$, a bifurcated spring for throwing up the handle and plate, applied with its bifurcated ends beneath a collar of the standard D, and with its free end bearing against the lever-handle, and suitable means for fastening the standard of the handle to the table piece or block, substantially as described.

3. The meat-tenderer comprising a plate having a pivoting-bracket and puncturing or cutting blades arranged, preferably, so that the blades of one row stand opposite the spaces of another row of blades, an angularly-bent lever-handle, a standard D, guide E, spring F, and table piece or block, said spring being applied beneath a collar of the standard D with its free end bearing against the lever-handle and the said standard and guide being provided with pointed penetrating-screws, substantially as described.

In testimony whereof I hereunto affix my signature in presence of two witnesses.

PETER A. HAUSE.

Witnesses:
R. W. HAUSE,
LESLIE HAUSE.